US009250686B2

(12) United States Patent
Nrusimhan N. V. et al.

(10) Patent No.: US 9,250,686 B2
(45) Date of Patent: Feb. 2, 2016

(54) METHOD AND APPARATUS FOR MONITORING, ASSESSING, AND MANAGING POWER SOURCE PERFORMANCE (75) Inventors: Lakshmi Nrusimhan N. V., Tamil Nadu (IN); Priyanka G. Sriraghavan, Tamil Nadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1485 days.

(21) Appl. No.: 12/640,212

(22) Filed: Dec. 17, 2009

(65) Prior Publication Data
US 2011/0154078 A1 Jun. 23, 2011

(51) Int. Cl.
*G06F 1/26* (2006.01)
*G06F 1/32* (2006.01)
*G06F 1/30* (2006.01)

(52) U.S. Cl.
CPC ............. *G06F 1/3212* (2013.01); *G06F 1/26* (2013.01); *G06F 1/30* (2013.01); *Y02B 60/1292* (2013.01)

(58) Field of Classification Search
CPC ............ G06F 1/26; G06F 1/30; G06F 1/3212
USPC .......................................... 713/300, 320, 340
See application file for complete search history.

(56) References Cited

U.S. PATENT DOCUMENTS 6,408,196 B2 * 6/2002 Sheynblat et al. ............ 455/574
2006/0217152 A1 * 9/2006 Fok et al. ...................... 455/557

* cited by examiner

*Primary Examiner* — Michael J Brown (57) ABSTRACT

An approach is provided for monitoring, assessing, and managing power source performance. Depletion of a power source of a mobile device caused by executing a plurality of activities is determined. A duration value is determined for executing each of the activities. The duration values are attributed to the depletion. Statistical data corresponding to performance of the power source is generated.

20 Claims, 8 Drawing Sheets

METHOD AND APPARATUS FOR MONITORING, ASSESSING, AND MANAGING POWER SOURCE PERFORMANCE

BACKGROUND INFORMATION

Consumer adoption of mobile devices, such as cellular telephones, laptop computers, pagers, personal digital assistants, and the like, is increasing. These devices can be used for a diversity of purposes (or activities) ranging from basic communications, to conducting business transactions, to managing entertainment media, and a host of other activities, e.g., asset tracking, content streaming, document editing, etc. When not plugged into an outlet, execution of one or more of these activities is limited to the extent with which a power source (e.g., battery) of the mobile device can power the execution of the activities. In order to aid consumers attempting to choose one mobile device over another, manufacturers typically provide consumers with power source performance guidelines indicating, for instance, maximum amounts of time (or duration) for conducting phone calls (e.g., "talk time"), for resting in an idle state (e.g., "standby time" or "hibernation time"), for presenting content (e.g., "multimedia playback time"), and the like. This information is useful when purchasing a mobile device, however, provides little in the way of monitoring, assessing, and managing the performance of the power supply subsequent to purchase, such as when the power supply depletes, ages, and/or otherwise cycles.

Therefore, there is a need for an approach that can efficiently and effectively monitor, assess, and manage power source performance.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for monitoring, assessing, and managing power source performance are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to monitoring, assessing, and managing power sources associated with mobile devices, it is contemplated that various exemplary embodiments are also applicable to stationary devices. It is further contemplated that various exemplary embodiments are additionally applicable to infrastructures, facilities, and systems, whether including or embodying a power supply.

Figure 1:
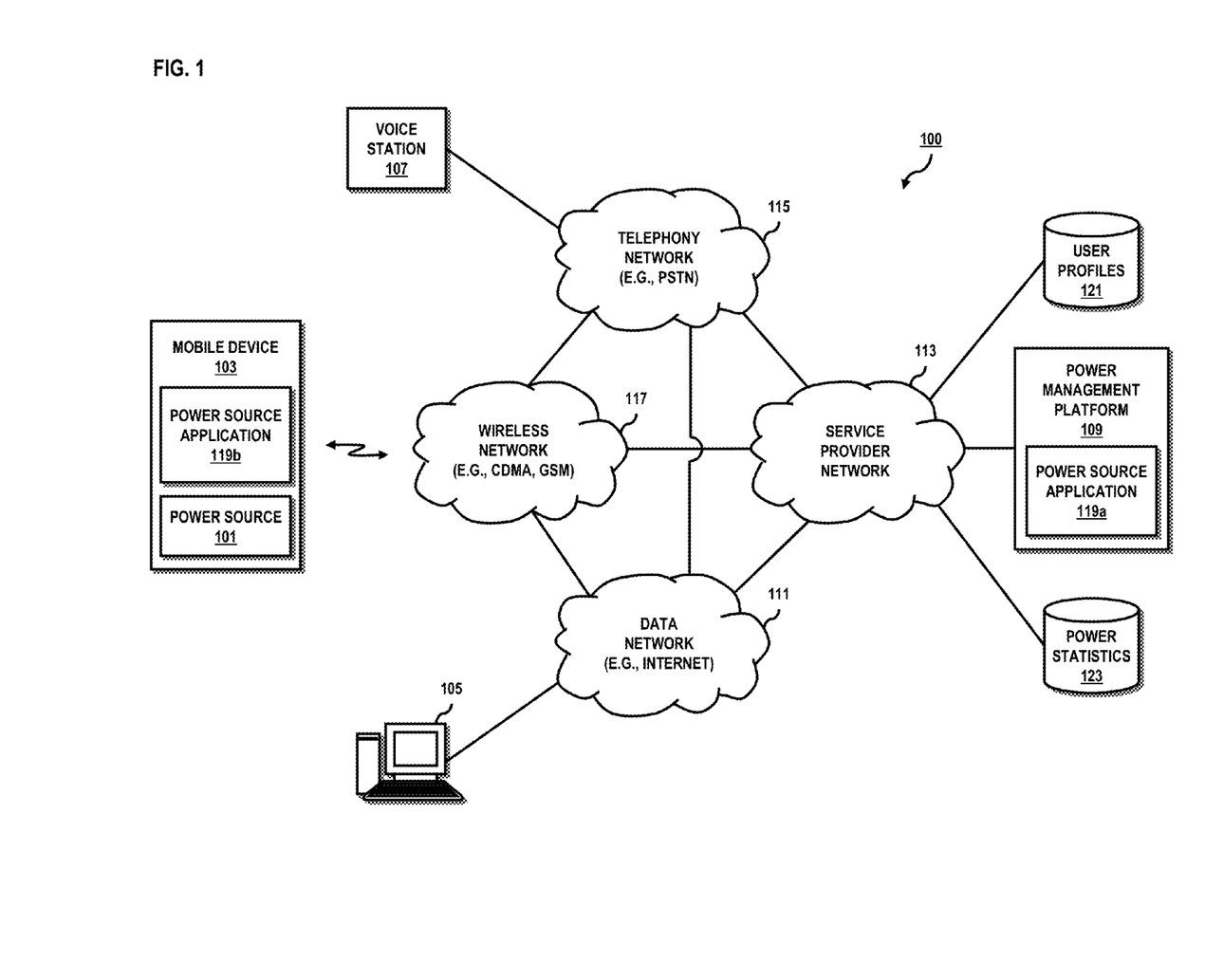
FIG. 1 is a diagram of a system configured to monitor, assess, and manage power source performance, according to an exemplary embodiment.

FIG. 1 is a diagram of a system configured to monitor, assess, and manage power source performance, according to an exemplary embodiment. For illustrative purposes, system 100 is described with respect to monitoring, assessing, and managing performance of one or more power sources (e.g., power source 101) associated with one or more mobile devices (e.g., mobile device 103), such as one or more cellular phones. According to certain embodiments, users at client devices (e.g., computing device 105, voice station 107, and/or another mobile device (not shown)) may access the features and functionality of power management platform (or platform) 109 over one or more networks, such as data network 111, service provider network 113, telephony network 115, and/or wireless network 117, to remotely monitor, assess, and manage performance of power source 101 via power source application 119a. Alternatively (or additionally), users of mobile devices 103 may locally monitor, assess, and manage performance of power source 101 of mobile device 103 via power source application 119b. While specific reference will be made hereto, it is contemplated that system 100 may embody many forms and include multiple and/or alternative components and facilities.

It is observed that manufacturers of mobile devices typically provide power source statistical data or performance ratings for the performance of a power source (e.g., battery) associated with their mobile devices. For instance, a manufacturer may specify a maximum duration for "talk time," "standby time," "multimedia playback time," and the like. This power source performance (or capacity) information may be useful to consumers when determining which mobile device to purchase over another, however, during the use of the mobile device, these consumers are generally unaware of how much actual "talk time," "standby time," "multimedia playback time," etc., remains after executing a plurality of activities on (or by) their mobile devices. Namely, consumers may be provided with a general indication of a remaining power source level, e.g., a percentage of remaining battery power, but such information is not directly translatable into remaining durations for executing a number of activities. Further, it is quite a burdensome, if not impossible, task for a consumer to accurately determine whether the power source associated with their mobile device is performing within specification, which is especially true as the power source ages. Moreover, consumers are unable to dynamically adapt the power settings of their mobile devices. For instance, consumers are unable to control when their mobile devices enter inactive states, such as, in response to, the depletion of their power sources and/or the degradation of power source performance over time.

Therefore, the approach of system 100, according to certain exemplary embodiments, stems from the recognition that consumers can benefit from the ability to locally and/or remotely monitor, assess, and manage performance of one or more power sources of or corresponding to their mobile devices. Certain other exemplary embodiments stem from the recognition that enabling consumers to obtain statistical data corresponding to power source performance in relation to one or more activities capable of execution on or by the mobile devices, allows these individuals to better understand the level at which their power source is depleted, as well as how much actual time (or duration) is available for executing particular ones of these activities, e.g., phone calls, messaging, multimedia playback, etc. Various other exemplary embodiments stem from the recognition that enabling mobile devices and/or users of these mobile devices to dynamically adjust (or otherwise adapt) the power settings of these devices, creates a more satisfactory user experience. Namely, such a dynamic adjustment capability enables increased control over when a mobile device enters an inactive state, such as, in response to, the depletion of a power source of (or associated with) the mobile device and/or the degradation of the performance of the power source over time.

According to exemplary embodiments, users at one or more client devices 103-107 may locally and/or remotely monitor, assess, and manage the performance of one or more power sources 101 of their mobile device(s) 103 via one or more of power source applications 119a or 119b. In this manner, users may submit requests to (or otherwise initiate execution of) power source application 119a and/or 119b to obtain statistical data indicating the performance of power source 101. This statistical data may include a plurality of durations remaining for executing a respective plurality of activities on (or by) mobile device 103, may provide historical performance of power source 101, may compare the performance of power source 101 with statistical data of a manufacturer, and/or may compare the performance of power source 101 with other mobile devices (not shown) and "other" power sources (not shown).

In certain exemplary embodiments, remote monitoring, assessment, and management of power source 101 may be provided via a suitable portal interface (not illustrated), such as a voice portal or a web portal. According to certain implementations, the portal may comprise one or more customized portlets (e.g., user interface components) arranged in one or more page layouts that provide a consistent "look and feel" for accessing the features and functions of platform 109. In those instances when the portal is implemented as (or includes) a voice portal, the portal may implement (or utilize) one or more speech synthesis and voice recognition techniques to audibly prompt users for various information and to reduce spoken utterances of the users and/or other signals (e.g., dual tone multi-frequency signals) associated with the users to one or more corresponding inputs. As such, the voice portal may provide users with similar access to platform 109 as the web portal; however, instead of user interactions being controlled via a "visual" interface, the voice portal may control user interactions via an "auditory" interface. It is noted that power source application 119a may be provided for implementing the portal and may be deployed via platform 109; however, it is contemplated that another facility or component of system 100, such as a frontend, middleware, or backend server, may deploy power source application 119a and, consequently, interface with platform 109. As such, it is contemplated that power source application 119a may be implemented on one or more of client devices 103-107 and, thereby, be configured to interface with platform 109, such as is the case for power source application 119b. In certain embodiments, one or more of power source applications 119a and/or 119b may function in conjunction with one another to achieve the features and functionalities of platform 109.

According to exemplary embodiments, the portal may include or provide users with the ability to access, configure, manage, and store user profile information to, for example, user profiles repository 121, as well as the ability to monitor, assess, and manage performance of power supply 101. As such, platform 109 may be configured to receive or retrieve power source statistical data from mobile devices 103 and, thereby, store this power supply statistical data to, for instance, power statistics repository 123. It is noted that repositories 121 and 123 may be aided or supplanted by any other suitable storage location or memory of (or accessible to) one or more of the components or facilities of system 100. Furthermore, and as will be described in more detail in association with FIG. 8, the portal may also provide users with the ability to define one or more modes of communication through which users desire to receive results of monitoring and assessing the performance of power sources 101. For instance, the portal may provide users with the ability to select (or otherwise provide) indications as to desired modes of delivery for the results, such as via electronic mail, short messaging service message, multimedia messaging service message, telephony call, facsimile, postal mail, networked application presentation, and the like. As such, the portal may further enable users to specify one or more directory addresses, email addresses, postal addresses, uniform resource locators, identifiers, etc., for effectuating delivery of the results to corresponding users. Whereas power source application 119a may provide remote monitoring, assessment, and management of power source 101, power source application 119b may provide local monitoring, assessment, and management of power source 101 via, for instance, one or more graphical user interfaces (GUI). Exemplary GUIs are described in more detail in association with FIGS. 8 and 9.

As seen in FIG. 1, service provider network 113 enables client devices 103-107 to access the features and functionalities of platform 109 via one or more of networks 111, 115, and 117. Networks 111-117 may be any suitable wireline and/or wireless network. For example, telephony network 115 may include a circuit-switched network, such as the public switched telephone network (PSTN), an integrated services digital network (ISDN), a private branch exchange (PBX), or other like network. Wireless network 117 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 111-117 may be completely or partially contained within one another, or may embody one or more of the aforementioned infrastructures. For instance, service provider network 113 may embody circuit-switched and/or packet-switched networks that include facilities to provide for transport of circuit-switched and/or packet-based communications. It is further contemplated that networks 111-117 may include components and facilities to provide for signaling and/or bearer communications between the various components or facilities of system 100. In this manner, networks 111-117 may embody or include portions of a signaling system 7 (SS7) network, or other suitable infrastructure to support control and signaling functions. As such, the conjunction of networks 111-117 may be adapted to facilitate monitoring, assessing, and managing performance of power source 101.

According to exemplary embodiments, client devices 103-107 may include any customer premise equipment (CPE) and/or network device capable of sending and/or receiving information over one or more of networks 111-117. For instance, voice station 107 may be any suitable plain old telephone service (POTS) device, facsimile machine, etc., whereas mobile device 103 may be any cellular phone, radio-phone, satellite phone, smart phone, wireless phone, or any other suitable mobile device, such as a personal digital assistant (PDA), pocket personal computer, tablet, customized hardware, etc. Further, computing device 105 may be any suitable computing device, such as a VoIP phone, skinny client control protocol (SCCP) phone, session initiation protocol (SIP) phone, IP phone, personal computer, softphone, workstation, terminal, server, etc. Even though only a limited number of client devices 103-107 are illustrated, it is contemplated that system 100 can support a plurality of client devices 103-107. In this manner, client devices 103-107 may be utilized to access the features and functionalities of power source application 119a and/or 119b to monitor, assess, and/or manage the performance of one or more power sources of (or associated with) mobile device 103. As previously noted, exemplary embodiments for monitoring, assessing, and/or managing power source performance may also be applied in monitoring, assessing, and/or managing power source performance of (or associated with) any suitable electronic device, infrastructure, facility, and/or system, whether including, being associated with, or embodying one or more power supplies. Mobile device 103 is described in more detail in association with FIG. 3.

As previously mentioned, system 100 may also include user profiles repository 121 for storing subscriber information, such as billing information, contact information, demographic information, location information, mobile device configurations, subscription parameters, and the like. Power statistics repository 123 may be provided for storing power source performance data, such as power source statistical data of a manufacturer corresponding to expected activity durations (e.g., "talk time," "standby time," multimedia playback time," and the like), historical power source statistical data generated via one or more of the processes described herein, power source statistical data of "other" mobile device power sources, and the like. Even though repositories 121 and 123 are depicted as extensions of service provider network 113, it is contemplated that repositories 121 and 123 may be integrated into, collocated at, or otherwise in communication with any of the various components or facilities of system 100.

In this manner, repositories 121 and 123 may be maintained by a service provider of system 100 or may be maintained by any suitable third-party. It is contemplated that the physical implementation of repositories 121 and 123 may take on many forms, including, for example, portions of existing repositories of a service provider, new repositories of a service provider, third-party repositories, and/or shared-repositories. As such, repositories 121 and 123 may be configured for communication over system 100 through any suitable messaging protocol, such as lightweight directory access protocol (LDAP), extensible markup language (XML), open database connectivity (ODBC), structured query language (SQL), and the like, as well as combinations thereof. In those instances when repositories 121 and 123 are provided in distributed fashions, information and content available via repositories 121 and 123 may be located utilizing any suitable querying technique, such as electronic number matching, distributed universal number discovery (DUNDi), uniform resource identifiers (URI), etc.

Figure 2:
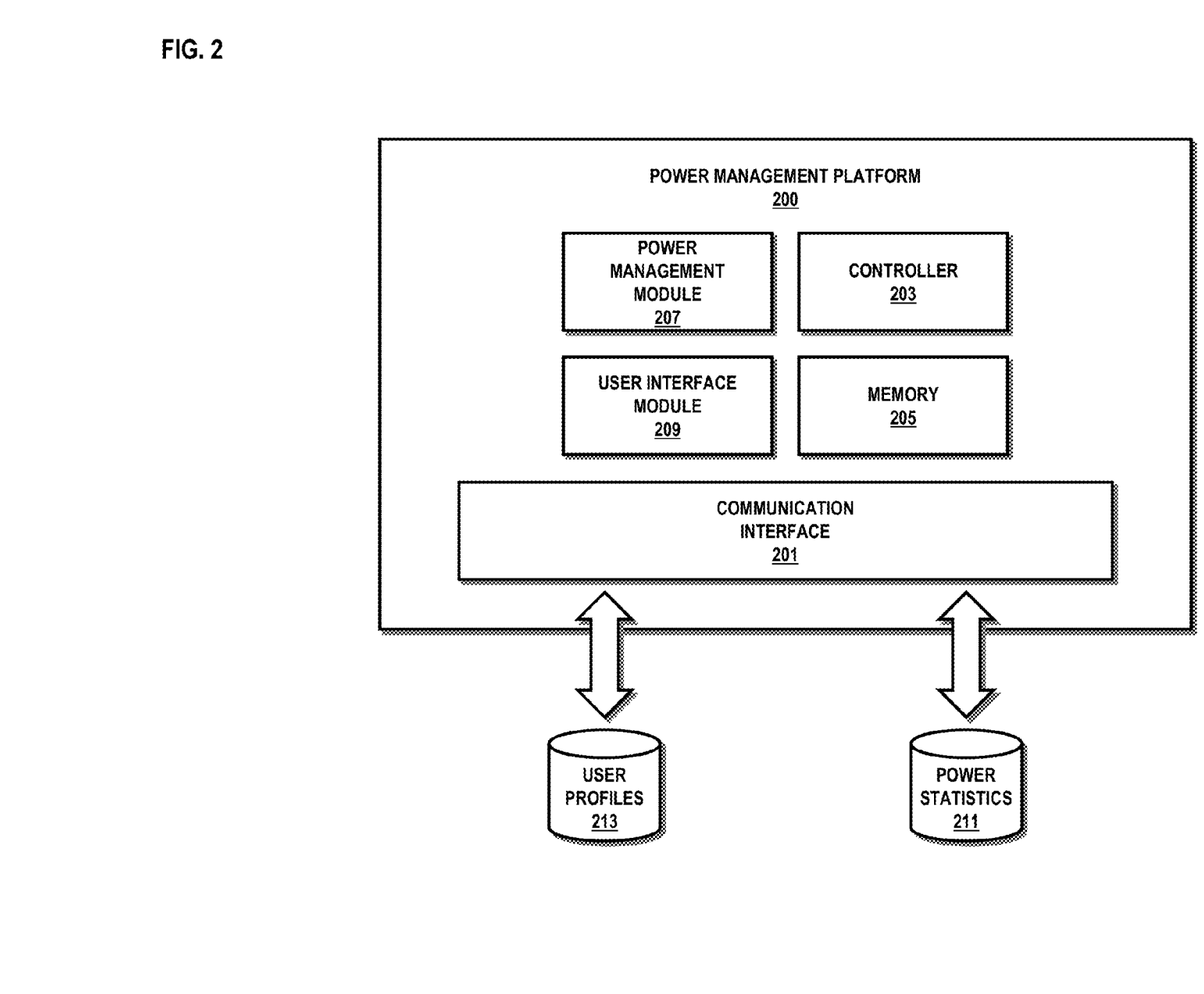
FIG. 2 is a diagram of a power management platform configured to facilitate monitoring, assessing, and managing power source performance, according to an exemplary embodiment.

FIG. 2 is a diagram of a power management platform, according to an exemplary embodiment. Power management platform (or platform) 200 may comprise computing hardware (such as described with respect to FIG. 10), as well as include one or more components configured to execute the processes described herein. In one implementation, platform 200 is implemented by a service provider of system 100 and is configured to include one or more communication interfaces 201, controllers (or processors) 203, memories 205, power management modules 207, and user interface modules 209. Platform 200 may also communicate with one or more repositories, such as power statistics repository 211 and user profiles repository 213. Users may access platform 200 (or the features and functionalities provided thereby) via client devices 103-107. While specific reference will be made to this particular implementation, it is also contemplated that platform 200 may embody many forms and include multiple and/or alternative components. For example, it is contemplated that the components of platform 200 may be combined, located in separate structures, or even separate locations, which, in the context of this example, may be components that are configured as part of or extensions to service provider network 113.

According to one embodiment, platform 200 embodies one or more application servers accessible to client devices 103-107 over one or more of networks 111-117. Users (or subscribers) can access platform 200 to create, customize, and manage one or more user profiles, as well as for monitoring, assessing, and managing performance of power source 101 associated with mobile device 103. As such, platform 200 may provide a user interface, e.g., web portal or other networked application (e.g., voice portal), to permit users to access the features and functionalities of platform 200 via client devices 103-107. According to certain embodiments, user interface module 209 may be configured for exchanging information between client devices 103-107 and a web browser or other network-based application or system, such as a voice browser or interactive voice recognition system.

In exemplary embodiments, user interface module 209 may be configured to execute one or more GUIs that are configured to provide users with one or more menus of options for creating, customizing, and managing user profiles, as well as engaging with the other features and functionalities of system 100, such as to remotely monitor, assess, and manage the performance of one or more power supplies 101. In this manner, user interface module 209 (via communication interface 201) may be configured to receive requests to monitor the depletion of one or more power sources 101 in relation to a plurality of activities capable of being executed on (or by) mobile device 103. In certain embodiments, this particular plurality of activities may be specified by a user (or owner) of mobile device 103. As such, user interface module 209 may provide requests to power management module 207 for monitoring and assessing the performance of power source(s) 101. Further, user interface module 209 may be configured to provide one or more GUIs to remotely manage the performance of power source(s) 101.

According to exemplary embodiments, power management module 207 may be configured to receive and, thereby, monitor real-time power source performance data (or information) generated by mobile devices 103. Power management module 207 may, additionally (or alternatively), "poll" mobile devices 103 for power source data and, thereby, determine power source performance data therefrom. In any event, data received from mobile devices 103 may be stored to power statistics repository 211 or any other suitable storage location or memory of (or accessible to) platform 200, such as memory 205. This power source data/power source performance data may also be ported to user interface module 209 for presentation to users via one or more GUIs. The operation of power management module 207 is similar to that of power source application 309 of FIG. 3 and, therefore, may be further understood with reference thereto, as well as with reference to FIGS. 4-9.

In order to provide selective access to the features and functionality of platform 200, platform 200 may also include an authentication module (not illustrated) for authenticating (or authorizing) users to platform 200. It is contemplated that the authentication module may operate in concert with communication interface 201 and/or user interface module 209. That is, the authentication module may verify user provided credential information acquired via communication interface 201 and/or user interface module 209 against corresponding credential information stored to a user profile of, for instance, user profiles repository 213. By way of example, the credential information may include "log on" information corresponding to a user name, password, coded key, or other unique identification parameter, such a personal identification number (PIN). In other instances, the credential information may include any one or combination of a birth date, an account number (e.g., bank, credit card, billing code, etc.), a social security number (SSN), an address (e.g., work, home, internet protocol (IP), media access control (MAC), port, etc.), or telephone listing (e.g., work, home, cellular, etc.), as well as any other form of uniquely identifiable datum, e.g., biometric code, voice print, etc. Subscribers may provide this information via client devices 103-107 such as by spoken utterances, dual-tone multi-frequency (DTMF) signals, packetized transmission, etc. It is contemplated that unobtrusive security may be provided by positively identifying and screening users based on one or more of the aforementioned credentials which may be seamlessly provided when client devices 103-107 communicate with platform 200, such as a unique IP or MAC address. Other unobtrusive measures can be made available via voice prints, etc.

Additionally, platform 200 may include one or more controllers 203 for effectuating the aforementioned features and functionalities of system 100, as well as one or more memories 205 for permanent and/or temporary storage of one or more of the aforementioned variables, parameters, information, signals, etc. In this manner, the features and functionalities of power source application 119a may be implemented by platform 200, such as, in response to, one or more memories 205 including computer program code being executed by one or more of controllers 203 to cause platform 200 to at least perform one or more of the processes described herein for monitoring, assessing, and/or managing power source performance.

Figure 3:
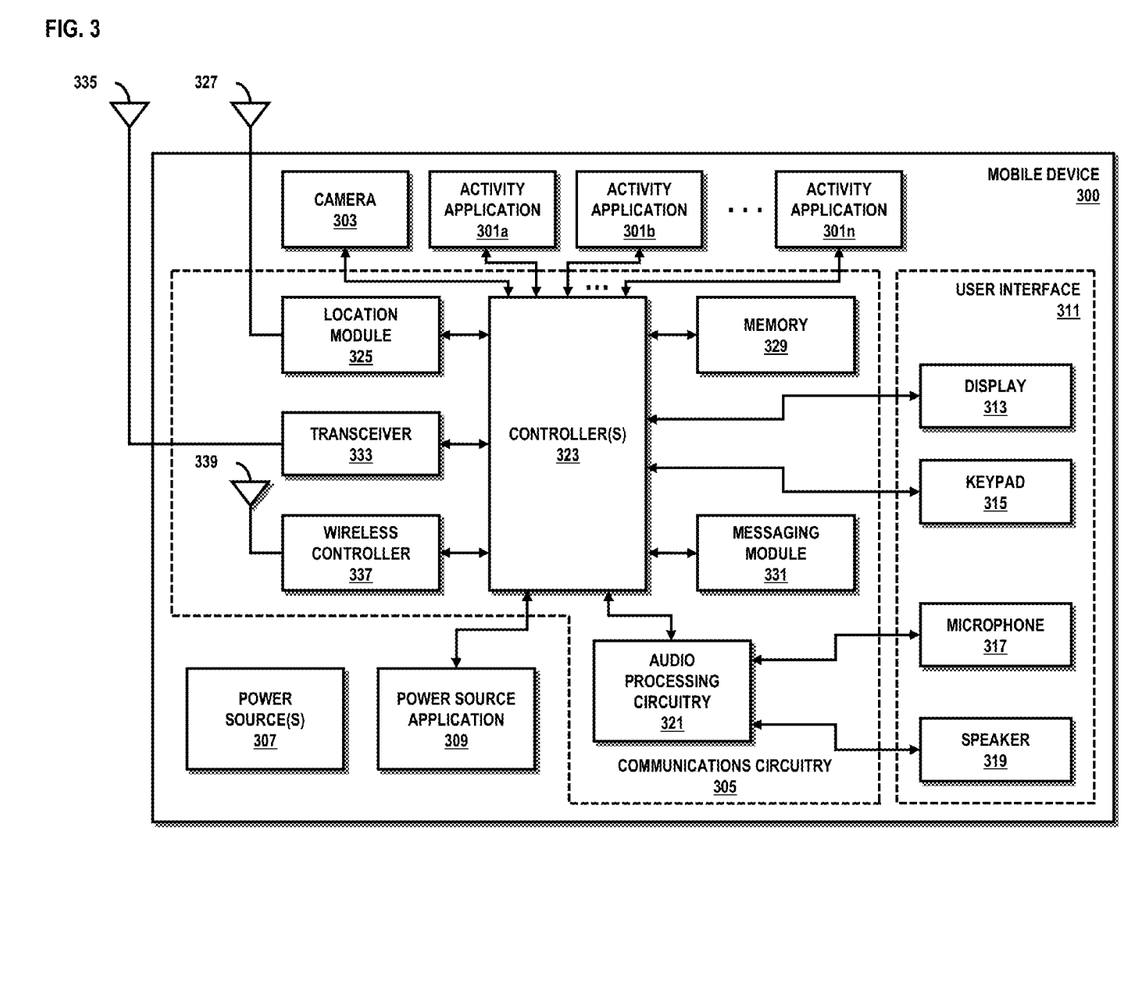
FIG. 3 is a diagram of a mobile device configured to facilitate monitoring, assessing, and managing power source performance, according to an exemplary embodiment.

FIG. 3 is a diagram of a mobile device configured to monitor, assess, and manage power source performance, according to an exemplary embodiment. Mobile device 300 may comprise computing hardware (such as described with respect to FIG. 10), as well as include one or more components configured to execute the processes described herein for monitoring, assessing, and managing power source performance. In this example, mobile device 300 includes a plurality of activity applications 301a-301n, camera 303, communications circuitry 305, one or more power sources 307, power source application 309, and user interface 311. While specific reference will be made hereto, it is contemplated that mobile device 300 may embody many forms and include multiple and/or alternative components.

According to exemplary embodiments, user interface 311 may include one or more displays 313, keypads 315, microphones 317, and/or speakers 319. Display 313 provides a graphical user interface (GUI) that permits users of mobile device 300 to view dialed digits, call status, menu options, and other service information, as well as monitor, assess, and manage performance of power source(s) 307. The GUI may include icons and menus, as well as other text and symbols. Keypad 315 includes an alphanumeric keypad and may represent other input controls, such as one or more button controls, dials, joysticks, touch panels, etc. The user may, via one or more components of user interface 311, conduct communications (e.g., phone calls), construct user profiles, enter commands, initialize activity applications, input remote addresses, select options from menu systems, and/or perform any number of other like or similar mobile device activities. Microphone 317 coverts spoken utterances of a user (or other auditory sounds, e.g., environmental sounds) into electronic audio signals, whereas speaker 319 converts audio signals into audible sounds.

Communications circuitry 305 may include audio processing circuitry 321, one or more controllers 323, location module 325 (such as a GPS receiver) coupled to antenna 327, one or more memories 329, messaging module 331, transceiver 333 coupled to antenna 335, and wireless controller 337 coupled to antenna 339. Memory 329 may represent a hierarchy of memory, which may include both random access memory (RAM) and read-only memory (ROM). Computer program code (or instructions) and corresponding data for operation can be stored in non-volatile memory, such as erasable programmable read-only memory (EPROM), electrically erasable programmable read-only memory (EEPROM), and/or flash memory. Memory 329 may be implemented as one or more discrete devices, stacked devices, or integrated with controller 323. Memory 329 may store information, such as one or more user profiles, one or more user defined policies, one or more contact lists, personal information, sensitive information, work related information, etc According to exemplary embodiments, activity applications 301a-301n may provide users with various functions for performing one or more activities via mobile device 300, such as browsing activities, business activities, calendar activities, communication activities, contact managing activities, content presentation activities, data editing (e.g., database, word processing, spreadsheets, etc.) activities, financial activities, gaming activities, imaging activities, location-based activities, messaging (e.g., electronic mail, IM, MMS, SMS, etc.) activities, media activities, multimedia activities, service activities, storage activities, synchronization activities, task managing activities, querying activities, standby state activities, powering off activities, settings activities, and the like. In this manner, the performance of power source 307 may be monitored, assessed, and managed in relation to one or more of activity applications 301a-301n.

Accordingly, controller 323 controls the operation of mobile device 300, such as for executing one or more activity applications 301a-301n and, in doing so, also monitoring, assessing, and managing performance of power source 307. That is, controller 323, in conjunction with one or more instructions (or computer program code) embodying power source application 309, may cause mobile device 300 to determine depletion of power source 307 caused by mobile device 300 executing the one or more activities, to determine a duration value (e.g., accumulated execution time) for executing each of the activities between, for instance, a first time period and at least one second (or subsequent) time period, to attribute the durations to the depletion of power source 307, and to generate statistical data corresponding to performance of source 307. It is noted that an exemplary process and illustrative user interfaces for monitoring and assessing performance of power source 307 is described in more detail in conjunction with FIGS. 4, 8, and 9.

In certain embodiments, depletion of power source 307 may be determined based on a difference between an initial power level of power source 307, which may be determined before the one or more activities are executed, and a subsequent power level of power source 307, which may be determined subsequent to executing the one or more activities. As such, the power level may be defined in terms of any suitable datum, however, in certain exemplary embodiments, the datum may be defined in terms of one or more duration values relating to executing the one or more activities. That is, the power level may be a plurality of time periods over which particular ones of the activities may be executed before power source 307 would become fully (or substantially) depleted, such as X amount of remaining minutes for "talk time," Y amount of remaining minutes for "standby time," and Z amount of remaining minutes for "multimedia playback time." It is noted that any number or combination of duration values may be utilized to define the power level of power source 307 and, in certain instances, may be particularly defined according to select ones of the activities, which may be selected (or specified) by a user of mobile device 300 or, instead, may be predetermined. According to certain other embodiments, the power level may be defined as a percentage value correlating a remaining power capacity with a potential (or fully energized) capacity. In still other embodiments, the power level may be defined in terms of remaining electrical driving force, e.g., a remaining amount of terminal voltage. An exemplary process for determining depletion of power source 307 is described in more detail in association with FIG. 5.

In this manner, the one or more instructions defining power source application 309 may, in conjunction with controller 323, cause mobile device 300 to attribute the duration values to the depletion of power source 307. That is, the depletion may be defined as the result of executing a certain set (or group) of one or more activities over respective executed durations. For example, executing one or more phone calls for a first total amount of time, executing one or more multimedia applications for a second total amount of time, and having mobile device 300 remain in an inactive standby state for a third total amount of time may result in a first depletion of power source 300, whereas a differing combining of activities and/or execution times may relate to various other depletions of power source 307. As such, the particular amount of determined depletion may be attributed to the determined duration values for the correspondingly executed activities. These attributed depletions may be utilized by mobile device 103 in dynamically learning the performance of power source 307 and, in particular instances, dynamically adapting thereto. Based on these durations values, attributed depletion amounts, historical attributed depletion amounts, power source data from a manufacturer, power source data from other mobile devices, mobile device 300 (via power source application 309 and controller 323) may generate statistical data corresponding to performance of power source 309. In this manner, the statistical data may measure performance relative to the duration values, relative to one or more performance claims of a manufacturer, relative to historical performance of power source 307, and/or relative to performance of other power sources and/or other mobile devices.

According to exemplary embodiments, the duration values, the attributed depletion amounts, the statistical data, the statistical data of the manufacturer, the statistical data corresponding to one or more other power sources and/or other mobile devices, etc., may be utilized by mobile device 300 (via power source application 309 and controller 323) to determine one or more threshold (or trigger) values for causing mobile device 300 to enter an inactive state, such as a standby state, hibernation mode, or powered off status. These threshold values may be defined in terms of remaining duration values relating to executing one or more of the activities, certain electrical driving forces, percentages correlating a remaining power source capacity to a potential (or fully energized) capacity, etc. As such, mobile device 300 may dynamically adjust and/or optimize how and when mobile device 300 enters or toggles between the one or more inactive states as power source 307 depletes, ages, and/or cycles. It is also contemplated that, in certain exemplary embodiments, these threshold values may be user-customizable so that users may be provided with greater control over when their mobile device becomes inactive, which, in certain instances, may be a frustrating transition when unexpected or undesired. It is noted, however, that the user may be prevented from customizing the threshold levels in such a manner that power source 307 may become fully (or substantially fully) depleted. This may be a safety feature to prevent the loss of, for instance, data (or other information) stored to a volatile memory of mobile device 300. It is also contemplated that one or more additional threshold values may be established, so that monitoring the power level of power source 307 may be additionally utilized to alert a user of mobile device 300 that the remaining power associated with power source 307 is approaching a level at which mobile device 300 will enter an inactive state, as well as (or alternatively) notify the user of one or more duration values that remain for executing a number of activities before mobile device 300 will enter the inactive state. These notifications may be visual, audible, and/or tactile and, as such, may be presented via one or more of the components of user interface 311 of mobile device 300. An exemplary process for causing mobile device 300 to enter an inactive state based on one or more dynamically and/or user-customized threshold values is more fully described with FIG. 7.

As such, control functions may be implemented in a single controller or via multiple controllers. Suitable controllers 323 may include, for example, both general purpose and special purpose controllers and digital signal processors. Controller 323 may interface with audio processing circuitry 321, which provides basic analog output signals to speaker 319 and receives analog audio inputs from microphone 317. It is also noted that mobile device 300 can be equipped with wireless controller 337 to communicate with a wireless headset (not shown) or other wireless network. The headset can employ any number of standard radio technologies to communicate with wireless controller 337; for example, the headset can be BLUETOOTH enabled. It is contemplated that other equivalent short range radio technology and protocols can be utilized.

Figure 4:
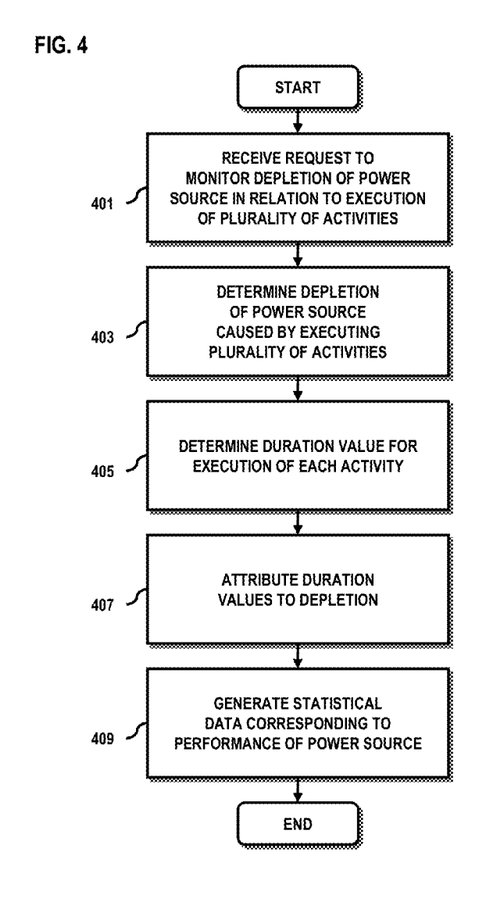
FIG. 4 is a flowchart of a process for monitoring and assessing power source performance, according to an exemplary embodiment.

FIG. 4 is a flowchart of a process for monitoring and assessing power source performance, according to an exemplary embodiment. For illustrative purposes, the process is described with reference to mobile device 300 of FIG. 3. It is contemplated, however, that the process may be executed via platform 200. Further, it is noted that the steps of the process may be performed in any suitable order, as well as combined or separated in any suitable manner. At step 401, mobile device 300 via, for example, controller 323 and one or more instructions embodying power source application 309, receives a request to monitor depletion of power source 307 in relation to the execution of a plurality of activities on (or by) mobile device 300. For instance, mobile device 300 may present a user of mobile device 300 with a GUI interface via display 313 for initiating the monitoring and assessment of the performance of power source 307. In certain embodiments, the GUI interface may enable the user to select a particular plurality of activities to monitor for the assessment of the performance of power source 307. An exemplary user interface is described in more detail in association with FIG. 8. In step 403, mobile device 300 via controller 323 and the one or more instructions determines depletion of power source 307 caused by executing one or more of the plurality of activities. Determination of the depletion of power source 307 is explained in more detail in accordance with FIG. 5. Per step 405, a duration value (e.g., total amount of execution time) is determined for each activity of the plurality of activities executed between initiation of power source application 309 and a subsequent time period, which may be predetermined or established by the user via the aforementioned user interface. These duration values may be stored to memory 329 or any other suitable storage location or memory of (or accessible to) mobile device 300, such as power statistics repository 123. At step 407, the duration values are attributed to depletion of power source 307. That is, the particular amount of determined depletion is associated as being the result of executing a particular plurality of activities for particular durations of time and, as such, may be utilized to correlate the duration values to expected depletions. Over time, these attributed depletions may be utilized to adaptively learn the performance of power supply 307, as well as utilized to determine the historical performance of power source 307. This is described in more detail in association with FIG. 5. At any rate, mobile device 300 may utilize one or more of the duration values, attributed depletions, historical attributed depletions, power source data from a manufacturer, and/or power source data from other mobile devices to generate (per step 409) statistical data corresponding to performance of power source 307 in association with executing a particular plurality of activities.

Figure 5:
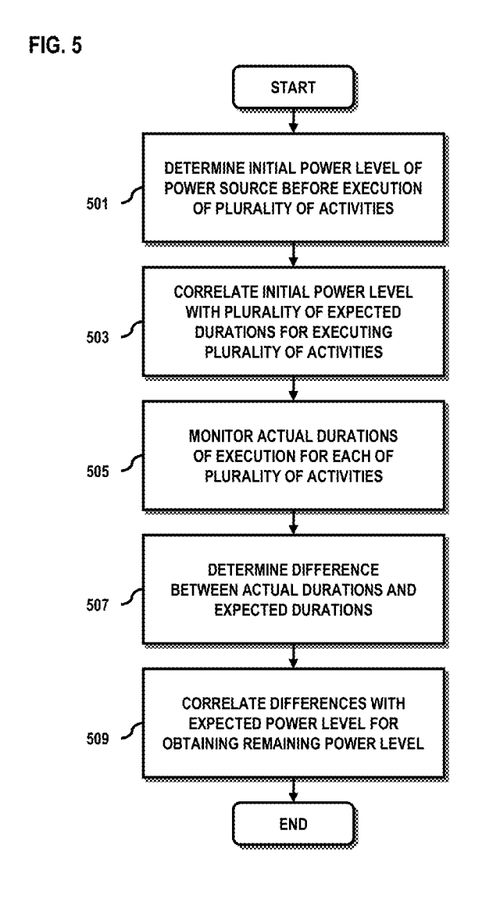
FIG. 5 is a flowchart of a process for determining depletion of a power source, according to an exemplary embodiment.

FIG. 5 is a flowchart of a process for determining depletion of a power source, according to an exemplary embodiment. For illustrative purposes, the process is described with reference to mobile device 300 of FIG. 3. It is contemplated, however, that the process may be executed via platform 200. Further, it is noted that the steps of the process may be performed in any suitable order, as well as combined or separated in any suitable manner. At step 501, mobile device 300 via, for example, controller 323 and one or more instructions embodying power source application 309, determines an initial power level of power source 307 before execution of a plurality of activities capable of being executed on (or by) mobile device 300. According to certain embodiments, the power level may be determined relative to a completely energized power state of power source 307, such as a percentage of a completely, or substantially completely, energized power source, or may be determined as one or more remaining durations for subsequent execution of a plurality of activities capable of implementation on (or by) mobile device 300. In other instances, the power level may be determined in terms of a remaining amount of electrical driving force associated with power source 307, which may be determined in any conventional manner, such as via a load tester (not shown) of mobile device 300 that may be configured to measure (or otherwise quantify) an "open-circuit" capacity of power source 307. It is also noted that the load tester of mobile device 300 may include one or more resistive elements that can be dynamically combined or separated to mimic the resistive capacities (or loads) imposed by one or more of those components of mobile device 300 that are utilized in the execution of one or more of the plurality of activities. As such, a meter (e.g., voltmeter, ammeter, etc.) of the load tester may be utilized to measure (or otherwise quantify) a "closed-circuit" capacity of power source 307 under the mimicked resistive capacity. Based on, for example, comparisons of the "closed-circuit" capacities between a first time period and a second time period and an expected (or adaptively learned) full capacity, dissipated and remaining amounts of electrical driving force may be determined. When the process is executed via platform 200, platform 200 may request or poll mobile device 300 for such information. It is noted that this initial power level may be correlated, per step 503, with an expected capacity (or power level) for power source 307 that, in exemplary embodiments, is defined in association with a plurality of remaining durations for executing a plurality of activities on (or by) mobile device 300. For example, the initial power level may be conventionally measured in terms of, for example, an amount of milliampere-hours (mAh). Based on one or more instructions embodying power source application 309, controller 323 may retrieve or determine a plurality of expected durations, which may be empirically discovered via experimentation, "fit" to a curve, and refined based on monitoring and assessing performance of power source 307 over time.

Accordingly, in step 505, mobile device 300 may determine a subsequent power level of power source 307 by monitoring (e.g., timing) actual duration for executing each of the plurality of activities during a predetermined interval. It is noted that each activity may be monitored alone or as one or more groups of activities. In this manner, mobile device 300 may determine one or more durations for executing the plurality of activities. At step 507, mobile device 300 may determine a difference between the initial power level correlated with one or more expected and/or adaptively learned duration values and the one or more monitored actual duration values. These "difference values" may be considered remaining duration values corresponding to one or more amounts of time that mobile device 300 may subsequently execute one or more of the plurality of activities. Per step 509, however, mobile device 300 may also correlate the "difference values" to an expected and/or adaptively learned power level defined as an amount of, for example, milliampere-hours, which may also be provided to the user or utilized to generate other statistical data corresponding to performance of power source 307.

Figure 6:
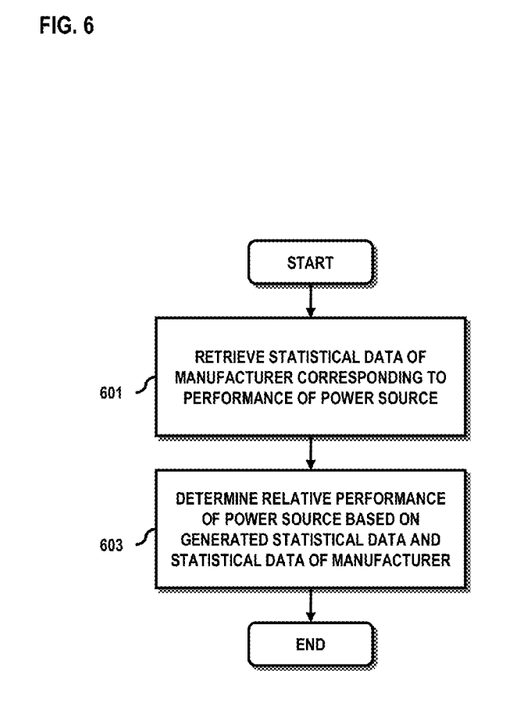
FIG. 6 is a flowchart of a process for determining relative performance of a power source, according to an exemplary embodiment.

FIG. 6 is a flowchart of a process for determining relative performance of a power source, according to an exemplary embodiment. For illustrative purposes, the process is described with reference to mobile device 300 of FIG. 3. It is contemplated, however, that the process may be executed via platform 200. Further, it is noted that the steps of the process may be performed in any suitable order, as well as combined or separated in any suitable manner. It is also noted that the process assumes the existence of generated statistical data corresponding to performance of power source 307, such as in response to the process of FIG. 4. At step 601, mobile device 300 via, for example, controller 323 and one or more instructions embodying power source application 309, retrieves statistical data of a manufacturer corresponding to performance of power source 307 of mobile device 300 from, for example, memory 329. It is noted, however, that the statistical data of the manufacturer may be retrieved from any other suitable storage location or memory of (or accessible to) mobile device 300, such as power statistics repository 211. Similarly, it is noted that platform 200 may retrieve such information from memory 205 and power statistics repository 211, as well as request or poll mobile device 300 for such information. In step 603, mobile device 300 determines, based on the generated statistical data and the retrieved statistical data of the manufacturer, relative performance of power source 307. That is, mobile device 300 determines the performance of power source 307 with respect to one or more specifications of the manufacturer relating to one or more expected durations for executing activities on (or by) mobile device 300. The relative performance of power source 307 may be utilized by the user of mobile device 300 for various purposes, such as, for example, ascertaining whether power source 307 is healthy or needs replacement, validating claims of a manufacturer, establishing one or more threshold values (or triggers) for causing mobile device 300 to enter one or more inactive states, e.g., a standby state, hibernation mode, or powered off status, based on depletion of power source 307, etc.

Figure 7:
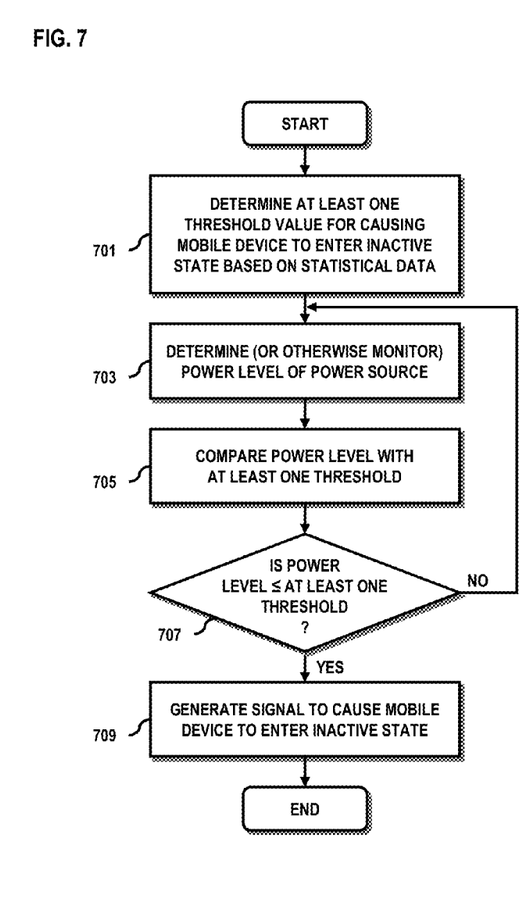
FIG. 7 is a flowchart of a process for causing a mobile device to enter an inactive state based on power source performance, according to an exemplary embodiment.

FIG. 7 is a flowchart of a process for causing a mobile device to enter an inactive state based on power source performance, according to an exemplary embodiment. For illustrative purposes, the process is described with reference to mobile device 300 of FIG. 3. It is contemplated, however, that the process may be executed via platform 200. In such instances, platform 200 and mobile device 300 may exchange information, as well as one or more commands, instructions, or other signals for carrying out the process. It is further noted that the steps of the process may be performed in any suitable order, as well as combined or separated in any suitable manner. Moreover, the process assumes the existence of generated statistical data corresponding to performance of power source 307, such as in response to the process of FIG. 4. At step 701, mobile device 300 via, for example, controller 323 and one or more instructions embodying power source application 309, determines at least one threshold value for causing mobile device 300 to enter an inactive state. In exemplary embodiments, the at least one threshold value may be selected so as to prevent a volatile memory of mobile device 300 from discarding information stored thereto. That is, the at least one threshold value may be determined so that enough "standby time" or "hibernation time" can be provided via a remaining power associated with power source 307. Although unnecessary, it is noted that the at least one threshold value may be defined with respect to one or a plurality of reference points, such that monitoring power source 307 need not directly monitor a remaining electrical driving force of power source 307. Namely, monitoring usage (or depletion) of power source 307 may be executed in terms of one or more remaining duration values corresponding to subsequent execution of a plurality of activities and/or in terms of one or more percentage values correlating a remaining power capacity with a potential (or fully energized) capacity. Accordingly, in step 703, mobile device 300 determines (or otherwise monitors) a power level associated with power source 307. It is noted that monitoring the power level may be performed based on a definition of the at least one threshold value or may be converted from one method of defining the power level to another method that can be compared (or otherwise correlated) with the at least one threshold value. Per step 705, mobile device 300 may compare the determined power level with the at least one threshold. At step 707, mobile device 300 may determine if a monitored power level is less than or equal to at least one threshold value. If, for example, the power level is less than or equal to the threshold value, mobile device may generate (per step 709) one or more signals to cause mobile device 300 to enter an inactive state, such as a standby state, hibernation mode, or powered off status. If, however, the power level is greater than the at least one threshold value, then mobile device 300 may continue to monitor the power level of power source 307. Accordingly, because the at least one threshold may be dynamically determined and implemented, mobile device 300 may optimize how and when it enters and/or toggles between these inactive states. It is also contemplated that one or more additional threshold values may be established, so that monitoring the power level of power source 307 may be additionally utilized to alert a user of mobile device 300 that the remaining power associated with power source 307 is approaching a level at which mobile device 300 will enter an inactive state, as well as (or alternatively) notify the user of one or more duration values that remain for executing a number of activities before mobile device 300 will enter the inactive state. These notifications may be visual, audible, and/or tactile and, as such, may be presented via one or more of the components of user interface 311 of mobile device 300.

Figure 8:
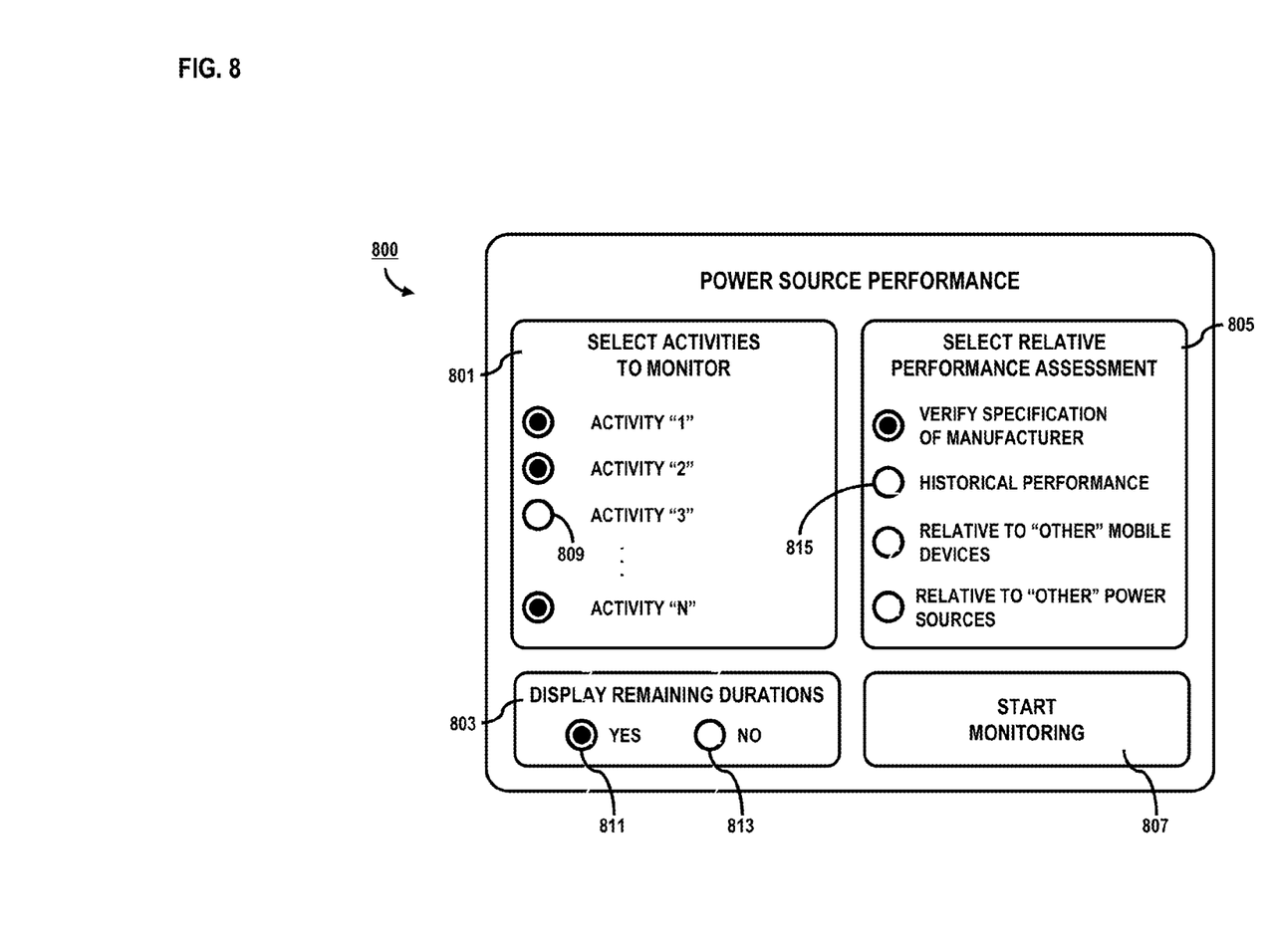
FIGS. 8 and 9 are diagrams of user interfaces configured to facilitate monitoring, assessing, and managing power source performance, according to an exemplary embodiment.
Figure 9:
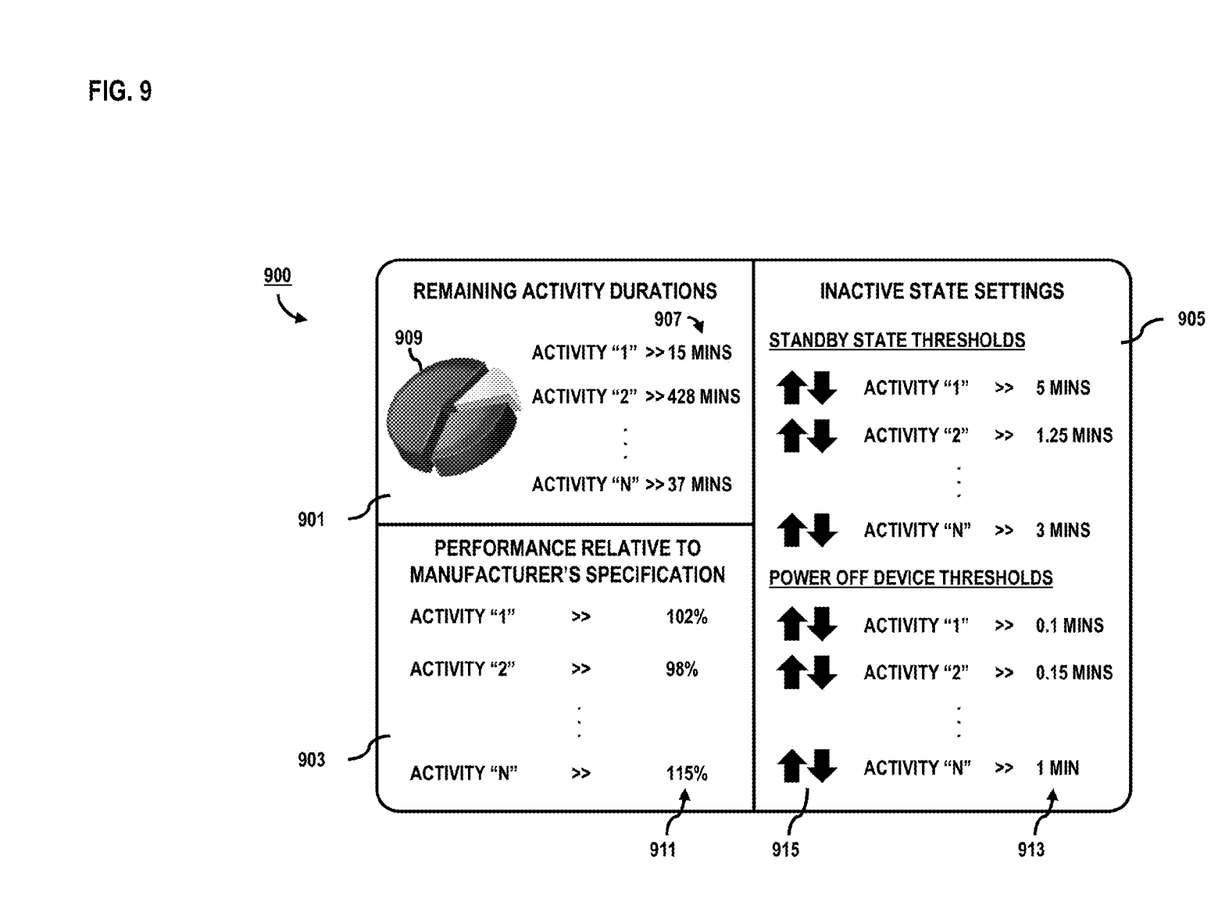

FIGS. 8 and 9 are diagrams of user interfaces configured to facilitate monitoring, assessing, and managing power source performance, according to an exemplary embodiment. In particular, FIG. 8 is an exemplary diagram of an illustrative user interface configured to facilitate user initiation of monitoring and assessing performance of power source 307 of mobile device 300. As shown, user interface 800 may be a GUI 800 configured to be presented to a user via display 313 of mobile device 300 in response to initiation of, for example, power source application 309. It is noted, however, that GUI 800 may be provided to remote users via user interface module 209. Hence, GUI 800 includes a plurality of regions (e.g., regions 801, 803, 805, and 807) for configuring mobile device 300 for monitoring performance of power source 307 in relation to execution of a plurality of activities on (or by) mobile device 300. In this manner, region 801 provides users with a plurality of selectable activities, such as "ACTIVITY '1'"-"ACTIVITY 'N,'" for monitoring and assessing performance of power source 307. According to certain embodiments, selection of activities in region 801 may be implemented via one or more interactive GUI elements, such as one or more radio buttons, e.g., radio button 809.

Region 803 enables users to select, e.g., via interactive GUI elements 811 or 813, whether or not a user desires to receive performance of power source 307 in terms of remaining durations (e.g., amounts of remaining time) for subsequent execution of the plurality of activities specified in, for example, region 801. It is noted that if no activities are selected in region 801, power source application 309 may be configured to monitor and assess performance of power source 307 in relation to a default plurality of activities or in relation to all activities executed on (or by) mobile device 300. In this manner, region 805 further enables users to be presented with one or more relative power source performance assessments, such as to verify a specification of a manufacturer of power source 307 and/or mobile device 300, to determine "current" performance in relation to historical performance of power source 307, and to determine performance of power source 307 in relation to one or more "other" mobile devices or "other" power sources. As before, one or more interactive GUI elements (e.g., interactive GUI element 815) may be provided for users to select desired relative performance assessments. Accordingly, region (or start button) 807 enables users to initiate monitoring and assessment of the performance of power source 307 based on the selections of regions 801-803. Even though not illustrated, GUI 800 may also provide users with the ability to define one or more modes of communication through which the user desires to receive the results of the monitoring and assessing of the performance of power source 307. For instance, GUI 800 may provide another region for the user to select delivery of the results via one or more of electronic mail, short messaging service message, multimedia messaging service message, telephony call, facsimile, postal mail, networked application presentation, and the like. As such, this other region may further provide one or more input fields for specifying one or more directory addresses, electronic mail addresses, postal addresses, uniform resource locators, identifiers, etc., for delivering the results to the user. Accordingly, mobile device 300 and/or platform 200 may be configured to transmit (or otherwise deliver) the results of the monitoring and assessing of the performance of power source 307 to the user-specified directory addresses, email addresses, postal addresses, uniform resource locators, identifier, and/or the like.

FIG. 9 is an exemplary diagram of an illustrative user interface configured to provide statistical data corresponding to performance of a power source, as well as provide one or more interactive features for managing performance of the power source. In this example, it is assumed that user interface 900 is a GUI 900 and is presented to a user via display 313 of mobile device 300 in response to a request to monitor depletion of power source 307 in relation to a plurality of activities, e.g., "ACTIVITY '1'"-"ACTIVITY 'N.'" Hence, GUI 900 includes a plurality of regions (e.g., regions 901, 903, and 905) for displaying statistical data and/or one or more power source management settings of mobile device 300. For instance, region 901 may provide a plurality of remaining activity durations 907 indicating respective amounts of time each activity may be executed before power source 307 is fully (or substantially fully) depleted. In certain embodiments, a pie chart (or other graphical depiction) 909 may be provided to pictorially illustrate remaining activity durations 907. Region 903 may provide a plurality of relative performances 911 indicating performance of power supply 307 in relation to, for example, statistical data of a manufacturer. Namely, relative performances 911 enable a user to assess whether power supply 307 is performing within one or more asserted performance claims of the manufacturer. For example, power supply 307 is able to provide above average performance for "ACTIVITY 'N,'" whereas the respective performances of "ACTIVITY '1'" and "ACTIVITY '2'" are about average. Region 905 provides a plurality of inactive state settings (or thresholds) 913 for causing mobile device 300 to enter an inactive state, such as a standby state, hibernation mode, or a powered off status. In this manner, if one or more of the remaining activity durations 907 are, for instance, respectively less than or equal to one or more of the thresholds 913, then mobile device 300 may enter a particular one of the inactive states. According to exemplary embodiments, threshold levels 913 may be user adjustable. As such, one or more interactive GUI components 915 may be provided to enable users to adjust thresholds 915 up or down, i.e., by adding or removing remaining activity duration.

The processes described herein for monitoring, assessing, and managing power source performance may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
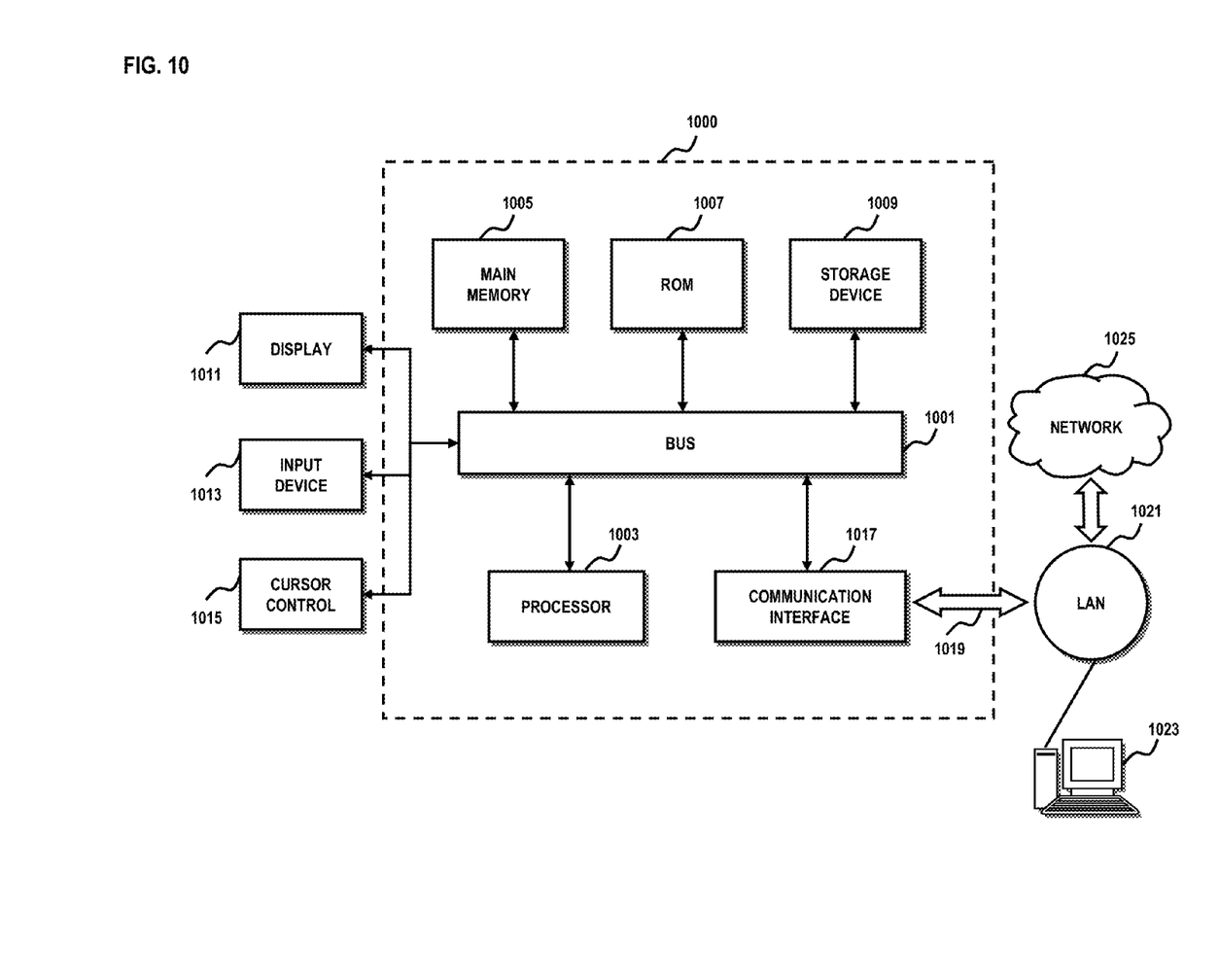
FIG. 10 is a diagram of a computer system that can be used to implement various exemplary embodiments.

FIG. 10 illustrates computing hardware (e.g., computer system) 1000 upon which exemplary embodiments can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an exemplary embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement exemplary embodiments. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
determining depletion of a power source of a mobile device caused by the mobile device executing a plurality of activities;
determining a duration value for executing each of the activities;
attributing the duration values to the depletion;
generating statistical data corresponding to performance of the power source; and
receiving a request to monitor the depletion in relation to a particular plurality of activities, wherein the particular plurality of activities is specified by a user of the mobile device.

2. A method according to claim 1, further comprising:
determining an initial power level of the power source before the plurality of activities are executed; and
determining a subsequent power level of the power source, wherein determining the depletion of the power source is based on a difference between the initial power level and the subsequent power level.

3. A method according to claim 1, further comprising:
retrieving statistical data of a manufacturer corresponding to performance of the power source; and
determining, based on the generated statistical data and the statistical data of the manufacturer, relative performance of the power source.

4. A method according to claim 1, further comprising:
determining, based on the statistical data, at least one threshold value for causing the mobile device to enter an inactive state.

5. A method according to claim 4, wherein the at least one threshold value is further determined based on historical generated statistical data.

6. A method according to claim 4, wherein the inactive state is a standby state, hibernation mode, or a powered off status of the mobile device.

7. A method according to claim 4, further comprising:
determining a power level of the power source;
comparing the power level with the at least one threshold value; and
generating, if the power level is less than or equal to the threshold value, a signal to cause the mobile device to enter the inactive state.

8. A method according to claim 7, wherein the power level and the at least one threshold value are defined as remaining durations for subsequent execution of the plurality of activities.

9. A method according to claim 1, wherein the statistical data relates to a respective plurality of remaining durations for subsequent execution of the plurality of activities.

10. A method according to claim 1, wherein the activities include one or more of a standby activity, a communication activity, and a content presentation activity.

11. An apparatus comprising:
at least one power source;
at least one processor; and
at least one memory including computer program code, the at least one memory and the computer program code being configured to, with the at least one processor, cause the apparatus at least to:
determine depletion of the at least one power source caused by the apparatus executing a plurality of activities;
determine a duration value for executing each of the activities;
attribute the duration values to the depletion;
generate statistical data corresponding to performance of the at least one power source; and
receive a request to monitor the depletion in relation to a particular plurality of activities, wherein the particular plurality of activities is specified by a user of the apparatus.

12. An apparatus according to claim 11, wherein the at least one memory and the computer program code are further configured to, with the at least one processor, cause the apparatus at least to:
determine an initial power level of the at least one power source before the plurality of activities are executed; and
determine a subsequent power level of the at least one power source,
wherein the depletion of the power source is determined based on a difference between the initial power level and the subsequent power level.

13. An apparatus according to claim 11, wherein the at least one memory and the computer program code are further configured to, with the at least one processor, cause the apparatus at least to:
retrieve statistical data of a manufacturer corresponding to performance of the at least one power source; and
determine, based on the generated statistical data and the statistical data of the manufacturer, relative performance of the power source.

14. An apparatus according to claim 11, wherein the at least one memory and the computer program code are further configured to, with the at least one processor, cause the apparatus at least to:
determine, based on the statistical data, at least one threshold value for causing the apparatus to enter an inactive state.

15. An apparatus according to claim 14, wherein the at least one threshold value is further determined based on historical generated statistical data.

16. An apparatus according to claim 14, wherein the inactive state is a standby state, a hibernation mode, or a power off status of the apparatus.

17. An apparatus according to claim 14, wherein the at least one memory and the computer program code are further configured to, with the at least one processor, cause the apparatus at least to:
determine a power level of the at least one power source;
compare the power level with the at least one threshold value; and
generate, if the power level is less than or equal to the threshold value, a signal to cause the apparatus to enter the inactive state.

18. An apparatus according to claim 17, wherein the power level and the at least one threshold value are defined as remaining durations for subsequent execution of the plurality of activities.

19. An apparatus according to claim 11, wherein the statistical data relates to a respective plurality of remaining durations for subsequent execution of the plurality of activities.

20. An apparatus according to claim 11, wherein the activities include one or more of a standby activity, a communication activity, and a content presentation activity.

* * * * *